United States Patent
Kawaguchi et al.

[11] Patent Number: 5,885,490
[45] Date of Patent: Mar. 23, 1999

[54] CONTINUOUS SHEET HAVING OPTICAL FUNCTIONS

[75] Inventors: Osamu Kawaguchi; Tsuneo Ando; Takumi Kosugi; Shuzo Ohara, all of Osaka, Japan

[73] Assignee: Goyo Paper Working Co., Ltd., Osaka, Japan

[21] Appl. No.: 947,352

[22] Filed: Oct. 8, 1997

Related U.S. Application Data

[63] Continuation of Ser. No. 647,323, May 9, 1996, abandoned.

[30] Foreign Application Priority Data

Oct. 23, 1995 [JP] Japan .................................. 7-299009

[51] Int. Cl.$^6$ ...................................................... B29D 11/00
[52] U.S. Cl. .......................... 264/1.32; 264/1.34; 264/1.6
[58] Field of Search ................................. 264/1.32, 1.34, 264/1.6; 428/156, 167, 163, 913

[56] References Cited

U.S. PATENT DOCUMENTS

| | | | |
|---|---|---|---|
| 3,146,492 | 9/1964 | Lemelson | 264/1.6 |
| 4,206,969 | 6/1980 | Cobb et al. | 350/126 |
| 4,332,847 | 6/1982 | Rowland | 264/1.6 |
| 4,478,769 | 10/1984 | Pricone et al. | 264/1.6 |
| 4,486,363 | 12/1984 | Pricone et al. | 264/1.4 |
| 4,601,861 | 7/1986 | Pricone et al. | 264/1.6 |
| 5,512,219 | 4/1996 | Rowland et al. | 264/1.6 |

FOREIGN PATENT DOCUMENTS

WO93/13929  7/1993  WIPO .................................. 264/1.6

*Primary Examiner*—Mathieu D. Vargot
*Attorney, Agent, or Firm*—Armstrong, Westerman, Hattori, McLeland & Naughton

[57] ABSTRACT

A continuous sheet having an optical function imparted thereto, which is obtained by extruding a thermoplastic resin on a three-dimensional pattern side of a continuous release sheet having a three-dimensional pattern in its surface to shus transfer said pattern to a surface of said thermoplastic resin, simultaneously contacting the other side of said thermoplastic resin with a cooling roll having an uneven pattern or a mirror surface to thus transfer said pattern or mirror surface to a surface of said thermoplastic resin in contact with said cooling roll, and separating by peeling said release sheet from said thermoplastic resin after cooling. The continuous sheet is free of a streak and scratch and freely cuttable in any desired size and form.

12 Claims, 2 Drawing Sheets

CONTINUOUS SHEET HAVING OPTICAL FUNCTIONS

This application is a continuation of application Ser. No. 08/647,323 filed May 9, 1996, now abandoned.

BACKGROUND OF THE INVENTION

1. Field of the Invention

The present invention relates to a continuous sheet having optical functions and, more particularly, to a continuous plastic sheet having optical functions such as (light) transmission, refraction, reflection, scattering, interference, polarization and the like, i.e., plastic lens, light reflection sheets, prism sheets, anti-dazzling sheets, diffusion sheets and a combination of such optical effects, which have been imparted by a continuous release sheet having a desired three-dimensional pattern in its surface.

2. Description of the Prior Art

Nowadays, films or sheets utilizing the optical properties of synthetic resin films or sheets (both called "sheet" hereinafter unless otherwise noted) are deeply related with industrial and daily living activities. Most of them, however, have their surface flat, competing merely in transparency of resins, or control ray transmissivity by such as making the surface matte or adding additives.

Lately, plastic lenses, and optically functional sheets such as prism sheets, anti-dazzling sheets and diffusion sheets as a structural component of liquid crystal displays used for note-type personal computers or liquid crystal TVs, which have special surface structures for adjusting, among others, surface reflectivity, refraction, scattering or combinations thereof have been drawing particular attention.

A sheet with a specific three-dimensional pattern is often made by press molding by the use of an embossed plate having a desired particular three-dimensional pattern or by injection molding. However, these methods are either poor in producibility because of a batch type production or have a problem of not being suitable for the formation of thin sheets. Meanwhile, for the production of a continuous sheet having a three-dimensional pattern, there are such alternatives as extruding through a profile die or using a proper embossing roll for patterning the surface of a sheet, but with these methods it is difficult to impart to the sheet surface a precise pattern for imparting thereto an optical performance and, even if such effect should be attainable, it is only attained partly, thus being inaccurate.

Hence, for obtaining a continuous sheet with a precise three-dimensional pattern imparted thereto, there has been proposed in U.S. Pat. No. 4,244,683 a method in which a molten synthetic resin is flown onto a planar press mold clamped to a movable belt for continuous embossing. Even by this method, however, it is impossible to obtain a continuous sheet having a seamless three-dimensional pattern which enables a continuous optical function.

It is possible to produce a patterned continuous sheet by coating by a method of, for example, coating the sheet surface with minute particles. This method, however, has defects of some foreign matters being contained therein or of the patterns attainable being limited by the size of such minute particles. Moreover, surface patterns are attainable by a similar printing method, but it is incapable of forming a three-dimensional pattern with its precision being enough for attaining a desired optical performance.

SUMMARY OF THE INVENTION

An object of the present invention is to provide a continuous optical function sheet such as lenticular sheets like prism sheets, lens arrays and lens sheets, anti-dazzling sheets, optical diffusion sheets, and sheets having a combination of such features, all these requiring minute and precise three-dimensional patterns, which is cuttable in any desired size and form with high productivity.

Other objects and advantages of the present invention will be apparent from the detailed description below.

DETAILED DESCRIPTION OF THE INVENTION

Figure 1:
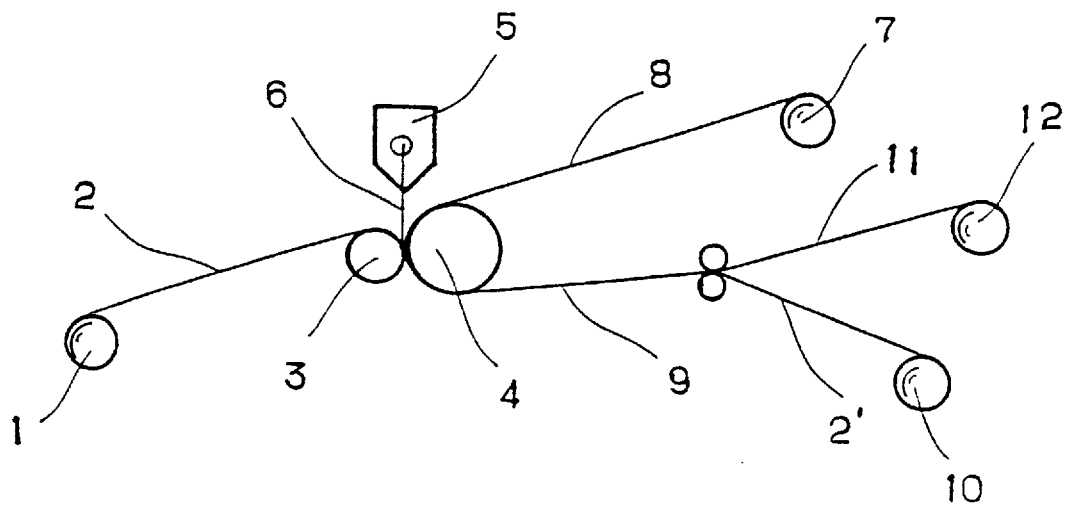
FIG. 1 is a schematic view showing an apparatus used in Example 1.

The present invention relates, in a first aspect, to a continuous sheet having an optical function imparted thereto which obtained by the following steps:

extruding a thermoplastic resin on a three-dimensional pattern side of a continuous release sheet having a three-dimensional pattern in its surface to thus transfer said pattern to a surface of said thermoplastic resin, simultaneously contacting the other side of said thermoplastic resin with a cooling roll having an uneven pattern or a mirror surface to thus transfer said pattern or mirror surface to a surface of said thermoplastic resin in contact with said cooling roll, and separating by peeling said release sheet from said thermoplastic resin after cooling.

The present invention relates, in a second aspect, to a continuous sheet having an optical function imparted thereto which is obtained by the following steps:

extruding a thermoplastic resin between a three-dimensional pattern side of a continuous release sheet A having a three dimensional pattern in its surface and a continuous release sheet B having or not having a three-dimensional pattern to thus transfer the respective pattern of said release sheets A and B to the both surfaces of said thermoplastic resin, and separating by peeling said release sheets A and B from said thermoplastic resin after cooling.

The present invention relates, in a third aspect, to a continuous sheet having an optical function imparted thereto which is obtained by the following steps:

extruding a thermoplastic resin between a light-transmitting base sheet or an optically functional sheet and a three-dimensional pattern side of a continuous release sheet having a three-dimensional pattern in its surface to thus transfer said pattern of the release sheet to a surface of said thermoplastic resin, separating by peeling said release sheet from said thermoplastic resin after cooling, and laminating said thermoplastic resin having said pattern and said base sheet or optically functional sheet.

Generally, it is difficult to obtain continuously an optically functional sheet with a precise three-dimensional pattern directly from a metal embossing roll. In order to obtain a continuous sheet having a given optical function, imparted by a three-dimensional pattern, the present inventors found out that it is the most effective to use a continuous release sheet having a precise three-dimensional pattern and have the pattern transferred onto a sheet of thermoplastic resin having proper properties.

In order to obtain a release sheet having a precise three-dimensional pattern by the use of a metal embossing roll, the present inventors found out that it is important to choose a synthetic resin which is excellent in shaping ability and releasability from the metal embossing roll even if it is less suited in optical or other required properties, and to choose molding conditions most balancing both shaping ability and releasability. As examples of such resins, there are included polyesters such as noncrystalline polyesters and polybutylene terephthalates, and polyolefins such as polyethylenes, polypropylenes and poly-4-methylpentene-1. When a precise three-dimensional pattern is desired, crystalline polyolefins low in glass transition temperature and high in crystalline melting point are favorable, since those are excellent in releasability as well as shaping ability.

A continuous release sheet having a three-dimensional pattern in its surface is produced by extruding a molten thermoplastic resin into the space between an embossing roll and a press roll (rubber roll). The most important molding condition is the temperature of the embossing roll, which has to be chosen to be suitable for releasing the embossed sheet therefrom. For improving the releasability, it is also possible to add a releasing agent to a resin and this enables holding the roll temperature high. Further, it is also possible to coat the embossing roll with a releasing agent. As examples of releasing agents, there are included silicone oils, paraffins, waxes and long-chain alkyl compounds, these being usable either alone or in combination of two or more. Care must be taken that excessive coating lowers the embossing ability, interfering with the precision of three-dimentional patterning.

For the production of a continuous release sheet having a three-dimensional pattern, it is important to choose as a material a heat-resistant synthetic resin withstanding the temperature required for the subsequent transferring to the thermoplastic resin layer. In this respect, preferred is polypropylenes or 4-methylpentene-1.

It is also possible to raise the heat resistance through the addition of inorganic or organic fillers. When even such a synthetic resin is insufficient with regard to the temperature at which it is transferred to a thermoplastic resin, it is possible to use a release sheet made of a composition curable by heat or light by being embossed by the use of a release sheet prepared by the above methods. As such compounds, epoxy resins, urethane resins and acrylic resins are usable and, if materials having high transparency and refractivity are chosen from those, that material itself can be a product having optical functions as in the present invention.

The three-dimensional surface pattern is directly related with the optical functions of the continuous sheet. As such patterns, there are included those of a prism type being in section isosceles triangles different in apex angle and scalene triangles somewhat slanted, arranged in series, or large and small triangles in section arranged in series, a wavy type in repeated sines in section, a lenticular lens type in repeated downward semicircles, a lens array type in mixed pyramids and downward semicircles etc. in section, and uneven patterns creating appearance such as a matte pattern, a semi-matte pattern, a linear pattern, a mesh-like pattern and a micro-uneven pattern. In cases where a three-dimensional pattern is of shallow unevenness or low transfer precision, direct transfer from the embossing roll is feasible, hence there is no particular reason for using a release sheet.

The thermoplastic resin to which a three-dimensional pattern is transferred may, as a rule, be good if it has a sufficient thermoplasticity, and there are included polyesters like polyethylene terephthalates and polybutylene terephthalates (including their copolymers), polyamides, polycarbonates, polyarylates, polyethersulfones, and acrylic polymers such as polymethylmethacrylates, polystyrenes, and polyolefins such as polypropylenes, poly-4-methylpentene-1 and noncrystalline cyclic polyolefins. Crystalline polyolefins are easily patterned by the direct embossing roll, hence it is of no good to have it retransferred. For further improving optical functions, required are higher transparency, higher refractive index and improved environmental capability, hence non-crystalline heat-resistant polyesters, polycarbonates and its copolymers or transparent blends, acrylic polymers such as polymethylmethacrylates, and noncrystalline cyclic polyolefins are preferred.

The aforementioned thermoplastic resin is extruded into the space between a continuous release sheet having a three-dimensional pattern in its surface and a cooling roll in contact with the reverse side thereof, and pressure is applied by a press roll (rubber roll) from the reverse side of the release sheet and the repetition patterns are formed on both sides thereof. The surface of the cooling roll is provided with an uneven pattern or is mirror-like. When it is mirror-like, the sheet obtained has one side thereof smooth and has optical functions on the other side, and a continuous sheet having optical functions such as prism sheets, lenticular lens sheets, lens arrays and anti-dazzling sheets are obtainable. Meanwhile, when the surface of the cooling roll is of a matte pattern, a semi-matte pattern, a linear pattern, a mesh-like pattern or a micro-uneven pattern, it is often the case that no high precision is required, and transfer from direct embossing roll (cooling roll) is feasible. Since, in this case, optical functions are possibly imparted to both sides of a sheet, a continuous sheet with complex optical functions such as anti-dazzling prism sheets or optical diffusion prism sheets are obtained.

It is also possible to put the aforementioned thermoplastic resin between continuous release sheets A and B and to have one side thereof pressed by a metal roll (cooling roll) and the other side by a press roll (rubber roll) to thus impart different patterns to both sides thereof for different optical functions. The combination may be of the same kind or of different kinds. In the latter case, either of the release sheets A and B may possibly be pattern-free (smooth).

In the case of combination of the same kind, taking a prism sheet, for example, the longitudinal directions of the repetition of prisms may be the same on both sides. It is also possible to have them intersected perpendicularly or at a given angle. Needless to say, it is possible to combine rows of prisms different in size. When the two release sheets with different kinds of patterns on both sides and especially when one sheet is smooth, a continuous sheet with a single optical function such as a prism sheet, lenticular lens sheet, lens array, anti-dazzling sheet or the like, in the same manner as when the aforementioned mirror roll is used. Different from when a mirror cooling roll is used, a so-called sandwich lamination method in which the molten thermoplastic resin is in no case in direct contact with the cooling roll, is used to thus result in less risk of formation of streaks or scratches in the resin surface. This further contributes to an improvement of dimensional stability of the continuous release sheet and surface patterns thereof due to aging, hence a high quality level is attainable. Moreover, since a large variety of optical functions are attainable through the combination of different optical patterns, a single sheet can have two functions which normally require lamination of two one-side patterned sheets.

For obtaining a laminated sheet of a light-transmitting base sheet and a thermoplastic resin sheet having a three-dimensional surface pattern, a so-called sandwich lamination method is used in which a light-transmitting sheet is fed from one side and a three-dimensionally patterned continuous release sheet from the other side and a thermoplastic resin is extruded into therebetween.

By this method, it is possible to impart the properties of the light-transmitting sheet to the optically functional sheet thus formed. For example, it is possible to impart to the continuous sheet transparency, such mechanical properties as tensile strength and elongation as well as heat resistance and environmental capability.

As the light-transmitting base sheet, there is no particular limitation if it only has a heat resistance enough to withstand the temperature at which a three-dimensional pattern is imparted to the base sheet, and there are included synthetic resin sheets such as polyesters like polyethylene terephthalates and polybutylene terephthalates, polyamides, polycarbonates, polyolefin-type synthetic resins such as polypropylenes, poly-4-methylpentene-1 (TPX) or laminated sheets thereof. Of these, particularly suitable is a biaxial oriented polyethylene terephthalate film. Further, lamination can be enhanced by such surface treatment as anchor coating and corona treatment.

When a sheet having an optical function is used instead of a light-transmitting base sheet, a laminated sheet having combined therein an optical function and another optical function imparted by a three-dimensional pattern. In this case, too, the sheet is required to be heat resistant enough to withstand the temperature at which a three-dimensional pattern is transferred. As such examples, there are included a polarized film of polyvinyl alcohol type, a polarized sheet admixed with various dyes, a phase difference film and an anti-dazzling sheet already known as optically functional sheets. If necessary, it is also possible to use a sheet with the aforementioned three-dimensional pattern on one side and laminate to the other side thereof a sheet having another three-dimensional pattern and in this way a sheet having compounded optical functions can be produced by lamination. In this case, the two sheets may possibly be of the same kind or of different kinds. In the latter case, a surface treatment such as anchor coating or corona treatment is in most cases considered suitable.

Figure 2:
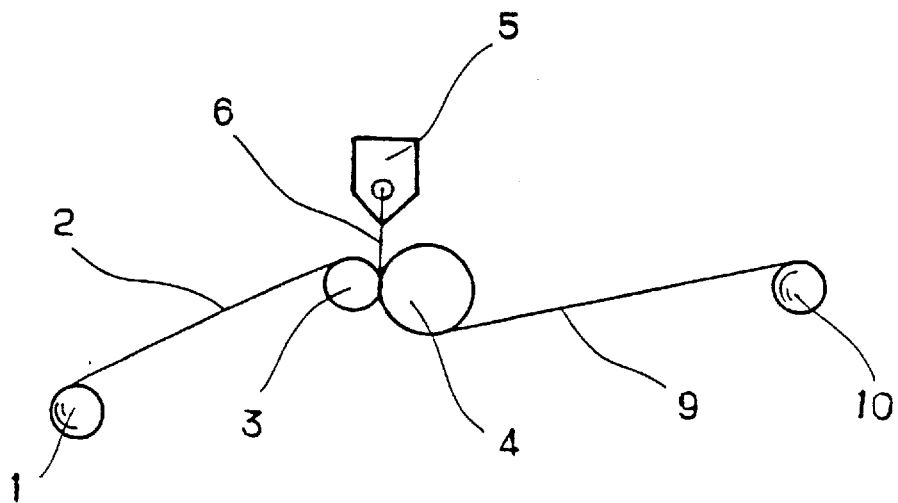
FIG. 2 is a schematic view showing an apparatus used in Example 2.

Examples of an apparatus used in the present invention are shown by FIG. 1 and FIG. 2.

In FIG. 1 and FIG. 2, the numeral 1 is a first pay-out unit, 2 or 2' is a continuous release sheet having a three-dimensional pattern in its surface, 3 is a press roll, 4 is a cooling roll, 5 is an extrusion laminator, 6 is a (molten) thermoplastic resin, 7 is a second pay-out unit, 8 is a base sheet, 9 is a laminate or a laminate I, 10 is a winder or a first winder, 11 is a laminate II, and 12 is a second winder.

A continuous sheet having an optical function imparted by the formation of a three-dimensional pattern of the present invention which is obtainable by melt-extrusion of a continuous release sheet having a three dimensional pattern has its optical function itself being continuous, hence, it is freely cuttable in any desired size and form, thus having a high producibility and yield.

The present invention will be described below in greater detail by way of examples, but the present invention is not limited thereby.

EXAMPLE 1

A biaxially oriented polyester film (EMBLET S-50LS, 50 μm: manufactured by Unitica Co., Ltd.) was paid out from the second pay-out unit of an apparatus shown in FIG. 1. Then, a noncrystalline cyclic polyolefin (APEL 6011T: manufactured by Mitsui Petrochemical Industries, Co., Ltd.) was extruded as a thermoplastic resin by a T-die extrusion laminator (screw diameter=40 mm, L/D=22) at a T-die outlet resin temperature of 300° C.

Figure 3:
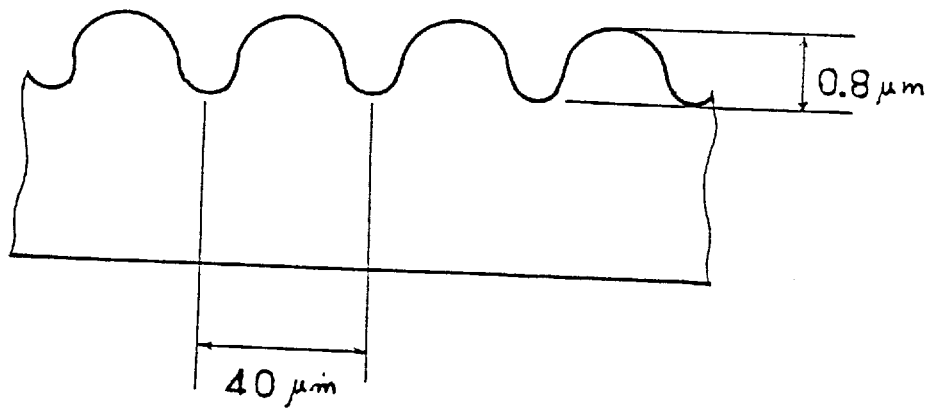
FIG. 3 is a schematic sectional view showing a repeated sine pattern.

Meanwhile, from the first pay-out unit, 200 μm-thick poly-4-methylpentene-1 (TPX) (DX-820: manufactured by Mitsui Petrochemical Industries, Co., Ltd.) having a repeated sine-pattern (FIG. 3) transferred from a metal embossing roll was paid out and then it was so arranged that its patterned side was in contact with the aforementioned APEL resin film and a press roll was used to press this film against the biaxially oriented polyester film and, thereafter, polysandwich lamination was carried out at a laminator speed of 10 m/min so as to make the extruded resin film 200 μm thick. After cooling by the cooling roll, the TPX sheet with its sine pattern was separated by peeling from the laminate I [release sheet (TPX) with a three-dimensional pattern/APEL/biaxially oriented polyester film] was wound up by the first winder and the separated laminate II [APEL resin with a three-dimensional pattern in its surface/biaxial oriented polyester film] was wound up by the second winder. Then, from the laminate II the biaxially oriented polyester film was separated off by peeling by a rewinder and a continuous sheet with a repeated sine pattern precisely transferred onto the surface of the APEL resin, free of streaks and scratches was thus obtained. This process enables simplification of one step (separation step).

This continuous sheet made of the APEL resin having a repeated sine pattern is useful as a diffuse sheet for liquid crystal displays.

EXAMPLE 2

Figure 4:
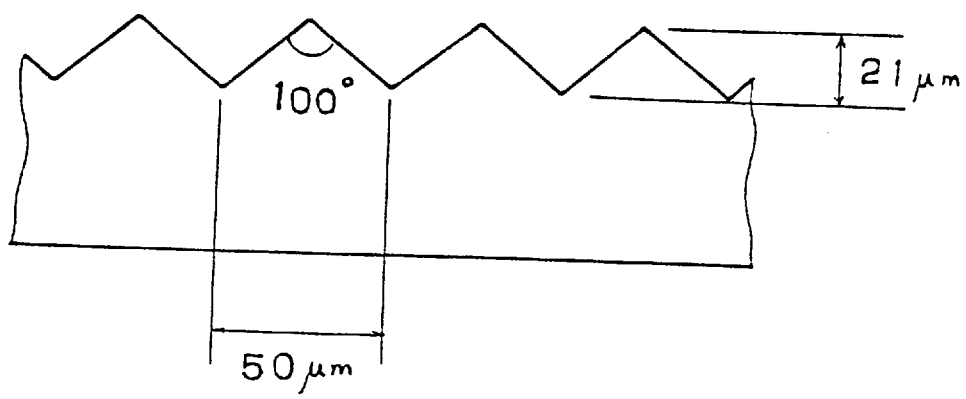
FIG. 4 is a schematic sectional view showing a saw-tooth pattern.

Instead of the continuous release sheet of the TPX resin with its repeated sine-pattern in Example 1, a commercially available prism sheet (230 μm thick) having in its surface saw-tooth pattern 50 μm in cycles and 21 μm in height (FIG. 4) with fore and back lead films affixed thereto was used, and instead of the thermoplastic resin APEL, a noncrystalline polyester resin (glass transition temperature 120° C.: manufactured by Kanebo Co., Ltd.) (T-die outlet resin temperature 280° C.) was used and extrusion lamination was carried out by an apparatus shown in FIG. 2 using a mirror-surfaced cooling roll, without using the biaxial oriented polyester film. The desired saw-tooth pattern was accurately transferred onto the noncrystalline polyester resin surface and a continuous sheet 150 μm-thick was thus obtained by separating by peeling off the prism sheet. This continuous sheet made of the noncrystalline polyester resin is useful as a prism sheet for liquid crystal displays.

EXAMPLE 3

A continuous sheet excellent in dimensional stability, streak and scratch-free, 200 μm-thick and having a saw-tooth pattern on both sides but different by 90° in apex-edge direction was obtained in the same manner as Example 1, except that instead of the TPX sheet with a repeated sine-pattern in the surface paid out from the first pay-out unit, a TPX sheet (continuous release sheet A) having a saw-tooth pattern (FIG. 4) similar to that in Example 2 was used, instead of the biaxially oriented polyester film paid out from the second pay-out unit, a TPX sheet (continuous release sheet B) having the same saw-tooth surface pattern as the sheet paid out from the first payout unit with the top edge direction only rotated by 90°, that is, having a saw-tooth edge pattern perpendicular to that of the sheet paid out from the first pay-out unit, and instead of the thermoplastic resin APEL, a polycarbonate (SP1010: manufactured Nippon GE Plastics Co., Ltd.) was used (T-die outlet resin temperature 280° C.).

This continuous sheet having a saw-tooth pattern on its both sides is useful as a prism sheet as a backlight part for liquid crystal displays, which is equivalent to the sheet made by laminating two films with the aforementioned pattern on one side.

As described above, the present invention enables the production of a continuous sheet having a three-dimensional pattern in its surface required for a given optical function continuously at a low cost. The surface of the continuous sheet obtained is streak and scratch-free and, with its optical function itself being continuous, can be cut freely in any desired size and form, this resulting in markedly higher producibility and yield.

What is claimed is:

1. A method for producing a continuous sheet having an optical functional imparted thereto comprising the following steps:

extruding a thermoplastic resin on a three-dimensional pattern side of a continuous thermoplastic release sheet having a three-dimensional pattern in this surface imparted by a metal embossing roll to thus transfer said pattern to a surface of said thermoplastic resin, simultaneously contacting the other side of said thermoplastic resin with a cooling roll having an uneven pattern or a mirror surface to thus transfer said pattern or mirror surface to a surface of said thermoplastic resin in contact with said cooling roll, and separating by peeling said thermoplastic release sheet from said thermoplastic resin after cooling.

2. A method for producing a continuous sheet having an optical function imparted thereto comprising the following steps:

extruding a thermoplastic resin between a three-dimensional pattern side of a continuous thermoplastic release sheet A having a three dimensional pattern in its surface imparted by a metal embossing roll and a continuous thermoplastic release sheet B having or not having a three-dimensional pattern imparted by a metal embossing roll to thus transfer the respective pattern of said thermoplastic release sheets A and B to the both surfaces of said thermoplastic resin, and separating by peeling said thermoplastic release sheets A and B from said thermoplastic resin after cooling.

3. A method for producing a continuous sheet having an optical function imparted thereto which is obtained by the following steps:

extruding a thermoplastic resin between a base sheet and a three-dimension pattern side of a continuous thermoplastic release sheet having a three-dimensional pattern in its surface imparted by a metal embossing roll to thus transfer said pattern of the thermoplastic release sheet to a surface of said thermoplastic resin, and separating by peeling said thermoplastic release sheet from said thermoplastic resin after cooling to produce a laminate of said thermoplastic resin having said pattern and said base sheet.

4. The method of claim 1, wherein the optical function imparted by the three-dimensional pattern is at least one selected from the group consisting of optical functions of a prism, a lens, light diffusion and a combination thereof.

5. The method of claim 1, wherein the cooling roll has an uneven pattern and the uneven pattern is at least one selected from the group consisting of a matte pattern, a line pattern, a mesh pattern, and a combination thereof.

6. The method of claim 3, wherein the base sheet is an optically functional sheet having at least one selected from the group consisting of optical functions imparted by a three-dimensional pattern, interference of light, polarization and a combination thereof.

7. The method of claim 3, wherein the base sheet is a light transmitting sheet.

8. The method of claim 2, wherein the optical function imparted by the three-dimensional pattern is at least one selected from the group consisting of optical functions of a prism, a lens, light diffusion and a combination thereof.

9. The method of claim 3, wherein the optical function imparted by the three-dimensional pattern is at least one selected from the group consisting of optical functions of a prism, a lens, light diffusion and a combination thereof.

10. The method of claim 1, wherein the continuous thermoplastic release sheet comprises poly-4-methylpentene-1.

11. The method of claim 2, wherein the continuous thermoplastic release sheet comprises poly-4-methylpentene-1.

12. The method of claim 3, wherein the continuous thermoplastic release sheet comprises poly-4-methylpentene-1.

* * * * *